United States Patent [19]

Dufft

[11] 4,225,192
[45] Sep. 30, 1980

[54] ANTISKID CONTROL VALVE

[75] Inventor: Jurgen Dufft, Kenilworth, England

[73] Assignee: Girling Limited, Birmingham, England

[21] Appl. No.: 963,160

[22] Filed: Nov. 22, 1978

[30] Foreign Application Priority Data

Jan. 13, 1978 [GB] United Kingdom ............... 1513/78

[51] Int. Cl.³ .......................... B60T 8/16; B60T 8/26
[52] U.S. Cl. ............................. 303/24 A; 303/24 C; 303/24 F
[58] Field of Search ......... 188/181 A; 303/24, 98–99, 303/24 R, 24 A, 24 C, 24 F, 115

[56] References Cited

U.S. PATENT DOCUMENTS

| 2,953,413 | 9/1960 | Jankauskas | 303/24 F |
| 3,147,046 | 9/1964 | Stelzer | 303/24 F |
| 3,163,473 | 12/1964 | Stelzer | 303/24 F X |
| 3,582,153 | 6/1971 | Pitcher | 303/24 C |
| 3,741,610 | 6/1973 | Holland | 303/24 F X |
| 3,881,786 | 5/1975 | Hayes | 303/24 F |
| 3,980,343 | 9/1976 | Stelzer | 303/24 C X |

Primary Examiner—Douglas C. Butler
Attorney, Agent, or Firm—Scrivener, Parker, Scrivener and Clarke

[57] ABSTRACT

A pendulum responsive to excessive deceleration operates a valve which creates a pressure differential across a pressure responsive member to close an inlet valve to the brake chamber and expand an outlet chamber to thereby reduce the rear brake pressure. The invention provides retaining mechanism for preventing the pendulum from swinging during non-braking periods and for returning the pendulum to its inoperative position upon a reduction of inlet pressure. A piston responsive to pressure at the inlet moves the retaining mechanism to a position wherein the inertia member is free to swing during normal brake applications.

8 Claims, 4 Drawing Figures

ANTISKID CONTROL VALVE

This invention relates to control valve assemblies for vehicle braking systems and is particularly concerned with such assemblies which incorporate a brake pressure proportioning valve for insertion in a brake pressure line between a pressure source and the rear wheel brakes.

Proportioning valves are known which reduce the outlet pressure applied to the rear wheel brakes, as compared to the full source (inlet) pressure supplied to the front wheel brakes, after a predetermined inlet pressure is attained.

In the Specification accompanying the copending patent application Ser. No. 963,159 assigned to the same assignee as the present invention of even date made by G. P. R. Farr, there is particularly described a control valve assembly comprising a proportioning valve having a control valve member, preferably a piston, movable in response to inlet pressure to open and close the valve, and means responsive to deceleration of the vehicle for reducing the pressure at the outlet after the valve has closed, the deceleration responsive means applying a force to the piston which acts in the same direction as the output force acting on the piston and in opposition to the force of the inlet pressure acting on the piston.

Preferably, the means responsive to vehicle deceleration comprises an inertia-responsive device and means for amplifying a signal from the inertia-responsive device to apply the force to the piston. The amplifying means is preferably a servo system.

In particular embodiments of the invention described in said Specification, the inertia-responsive device is a pendulum arranged to operate a valve which creates a pressure differential across a pressure-responsive member, which may be a diaphragm or a piston, the pressure-responsive member being connected to the control valve member and movable to apply a load to the control piston in dependence upon the differential pressure which is in turn dependent on the vehicle deceleration. If, due to a rapid brake application the outlet pressure is too high for the given deceleration, the pressure-responsive member overcomes the brake pressure force and the control piston moves to close the metering valve and expand the outlet chamber until the force balance between the inlet pressure acting on the piston on the one hand and the outlet pressure on the piston together with the deceleration responsive force applied to the piston on the other hand are balanced.

In the absence of opposing hydraulic inlet pressure, the pressure-responsive member, being subjected to a pressure differential due to the pendulum moving to its operative position, will stroke the control piston down its bore towards the pressure inlet port when the engine is in operation during the previously described conditions. This movement of the control piston closes the valve and forces pressure fluid back through the inlet to the brake master cylinder and thence to the fluid reservoir. The volume on the outlet side of the valve simultaneously increases and the fluid is sucked from the rear wheel brake cylinder through the outlet, thereby causing a partial evacuation of the rear wheel cylinders. Such evacuation could cause air to pass the cylinder seals.

When the first brake application is made under these circumstances the control piston has to be returned to its normal operating position before the valve can operate normally. The resultant excess brake pedal travel and corresponding delay in brake actuation, or the air ingress previously described could cause total brake failure.

The present invention aims to overcome the above-described problems and provides a control valve assembly for a vehicle braking system, comprising an inlet and an outlet, a proportioning valve controlling communication between said inlet and said outlet said proportioning valve having a control valve member movable to open and close said valve, inertia-responsive means responsive to deceleration of the vehicle for reducing the pressure at said outlet after said valve has closed, said inertia-responsive means, comprising an inertia-responsive member which is movable to apply a load to said control valve member and retaining means which prevents movement of said inertia-responsive device from an inoperative position in the absense of pressure at said inlet.

Said inertia-responsive device may be in its inoperative position when the vehicle is not decelerating or is decelerated by means other than applied brake pressure.

The retaining means preferably also acts to return the inertia-responsive means to its inoperative position upon a reduction of inlet pressure.

The retaining means preferably comprise a retaining member co-operating with the inertia-responsive means and movable between a first position in which the inertia-responsive means is prevented from movement and a second position in which the inertia-responsive means can move freely, and an auxiliary piston which is subjected to inlet pressure and movement of which moves the retaining member.

A control valve assembly in accordance with the invention for a vehicle braking system will now be described, by way of example, with reference to the accompanying drawings, in which:

FIG. 3 is a plan view of a retaining member of the assembly, and FIG. 4 is a detail view illustrating the cooperation of the retaining member with an inertia-responsive member.

The illustrated valve assembly is generally similar to the assembly described and illustrated in FIGS. 3 and 4 of the said Specification of the co-pending Patent Application of even date to which reference is made.

Figure 1:
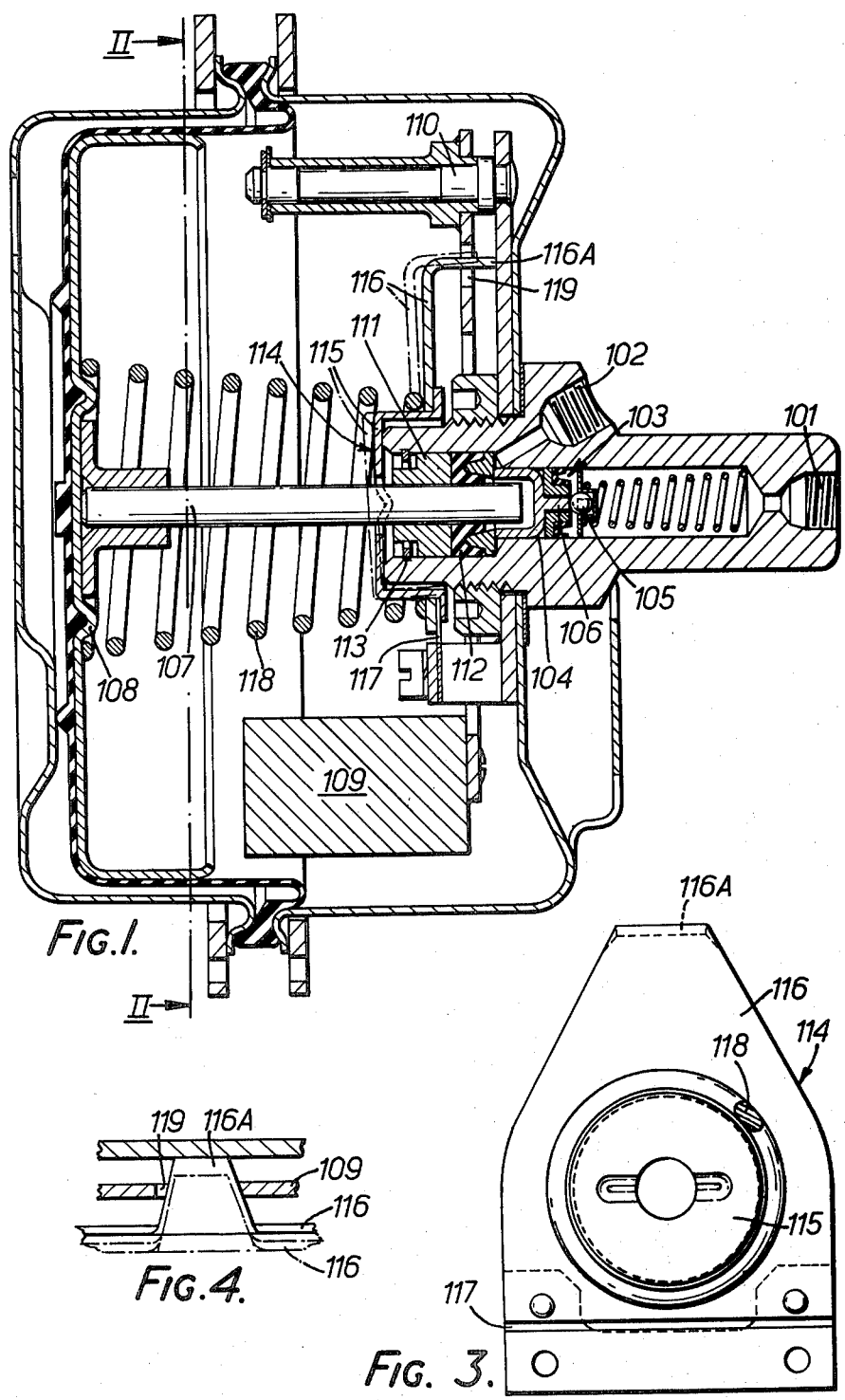
FIG. 1 is an axial cross-sectional view of the assembly.
Figure 2:
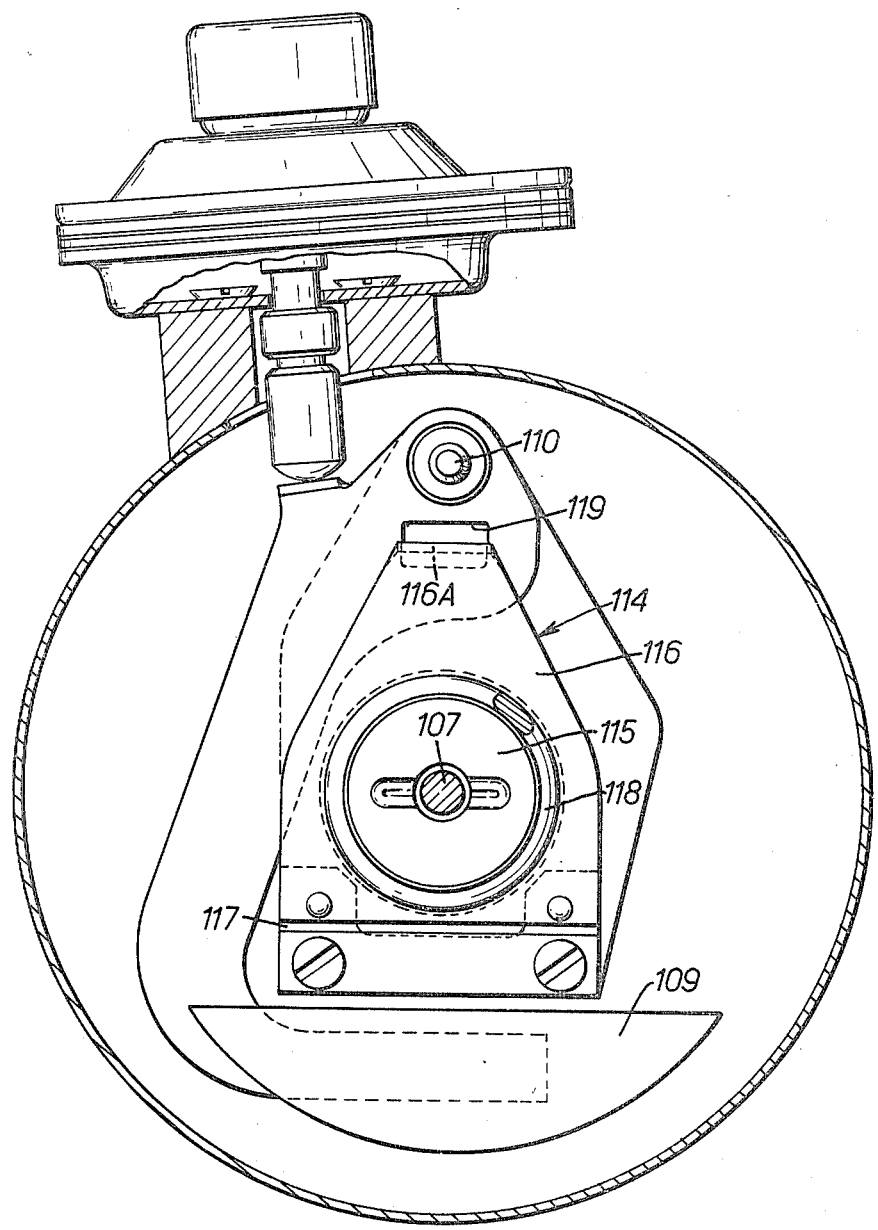
FIG. 2 is a cross-sectional view taken on line II—II of FIG. 1, with some parts omitted for clarity.

Briefly, the assembly of FIGS. 1-4 comprises an inlet 101 for connection to a pressure source, an outlet 102 for connection to the rear wheel brake cylinders, proportioning valve 103 comprising a control piston 104 having a valve seat engageable with a closure ball 105, the valve normally being held open by a spigot 106.

A load is applied to the piston 104, in response to vehicle deceleration, by a rod 107 movable with a diaphragm 108 which is subjected to a fluid pressure differential in dependence upon the position of an inertia-responsive pendulum 109 mounted on a pivot 110.

When pressure is applied to the inlet the control valve initially permits full pressure to be passed to the outlet, but after "cut-in" pressure is attained the valve acts to meter pressure to the outlet so that the outlet pressure is reduced as compared to the inlet pressure. The cut-in pressure is dependent upon the load applied to the control piston 104 by the diaphragm 108 which is in turn dependent upon the position of the pendulum 109.

If during deceleration the force applied to the control piston by the diaphragm together with the outlet pressure forces acting on the cross-sectional area of the control piston is greater than the force of the outlet pressure acting on the rod 107 and the inlet pressure acting on the control piston 104, then the control piston moves to the right to expand the outlet volume and thereby reduce the outlet pressure and rear wheel braking force to a level compatible with the sensed deceleration, to thereby reduce the risk of wheel lock.

The illustrated assembly includes means for retaining the pendulum 109 in its inoperative position in the absence of inlet pressure and to return the pendulum to said position when inlet pressure is reduced.

The retaining means comprises an auxiliary piston 111 which on one side abuts a sliding seal 112 and on its other side is engageable with a stop in the form of a spring clip 113. A retainer 114 has a central cup-shaped portion 115 to which is secured a radially outer portion 116. The radially outer portion has a ramp-like projection 116A which co-operates with an aperture 119 in the arm of pendulum 109, as best seen in FIG. 4. The inner portion 115 is hinged to a fixed housing part by a spring steel hinge 117. The retainer is biased to the illustrated inoperative position by a diaphragm return spring 118.

Upon operation of the brake pedal, inlet pressure moves piston 111 into engagement with the retainer portion 115 and thereafter into engagement with spring clip 113, against the bias of spring 118. The retainer 114 moves on hinge 117, to a position shown in chain dotted lines in FIG. 1. The ramp 116A disengages from the edge of pendulum aperture 119 and the pendulum 109 is free to swing according to the prevailing 'g' signal.

When releasing the foot pedal, the return spring 118 will overcome decreasing pressure force and move retainer 114 and piston 111 back to the inoperative position. Ramp projection 116A will again make contact with the side of aperture 119 and move pendulum 109 back to the inoperative position as shown, removing the force of the diaphragm and keeping the diaphragm at rest as shown.

Ideally, movement of piston 111 should occur below the minimum cut-in pressure of the valve assembly and should be as short as possible since its stroke represents a loss in the foot pedal travel.

In the above-described assembly, movement of the pendulum is prevented when there is no applied inlet pressure and the pendulum is returned to its inoperative position when the inlet pressure is reduced.

I claim:

1. A control valve assembly for a vehicle braking system, comprising an inlet an outlet, a proportioning valve controlling communication between said inlet and said outlet, said proportioning valve having a control valve member movable to open and close said valve, inertia-responsive means responsive to deceleration of the vehicle for reducing the pressure at said outlet after said valve has closed, said inertia-responsive means comprising an inertia-responsive member which is movable to apply a load to said control valve member, and fluid pressure operable retaining means which prevents movement of said inertia-responsive means from an inoperative position, in the absense of pressure at said inlet.

2. A control valve assembly according to claim 1, wherein said retaining means includes means which returns said inertia-responsive means to said inoperative position upon a reduction of inlet pressure.

3. A control valve assembly according to claim 1, wherein said retaining means comprises a restricting member co-operating with said inertia-responsive means and being movable in response to inlet pressure between a first position in which said inertia-responsive means is prevented from moving and a second position in which said inertia-responsive means can move relatively freely.

4. A control valve assembly according to claim 3, including biasing means biasing said restricting member to said first position.

5. A control valve assembly according to claim 4, wherein said pressure operable member is subjected to said inlet pressure and is in force-transmitting relation with said restricting member, said pressure operable member being movable in response to inlet pressure to urge said restricting member from said first to said second position.

6. A control valve assembly according to claim 5, including a housing having a bore within which said valve is mounted, said pressure operable member being in the form of a piston working in said bore and being engageable with said restricting member.

7. A control valve assembly according to claim 6, wherein said restricting member is pivotally mounted on said housing.

8. A control valve assembly according to claim 7, wherein said restricting member is inherently resilient.

* * * * *